United States Patent
Ohue et al.

(10) Patent No.: US 7,474,436 B2
(45) Date of Patent: Jan. 6, 2009

(54) PHOTOGRAPHIC PRINTING SYSTEM

(75) Inventors: Masahide Ohue, Wakayama (JP); Shoichi Nakano, Wakayama (JP)

(73) Assignee: Noritsu Koki Co., Ltd., Wakayama-Ken (JP)

( * ) Notice: Subject to any disclaimer, the term of this patent is extended or adjusted under 35 U.S.C. 154(b) by 1106 days.

(21) Appl. No.: 10/413,082

(22) Filed: Apr. 14, 2003

(65) Prior Publication Data

US 2006/0050322 A1 Mar. 9, 2006

(30) Foreign Application Priority Data

Apr. 19, 2002 (JP) .............................. 2002-117626

(51) Int. Cl.
  G06F 15/00 (2006.01)
  G06F 13/00 (2006.01)
  G11B 11/00 (2006.01)

(52) U.S. Cl. ...................... 358/1.16; 711/153; 711/163; 711/164; 369/13.05

(58) Field of Classification Search ................ 358/1.18, 358/1.17, 1.16; 396/310; 348/96; 355/84; 711/153, 163, 164; 369/13.05
See application file for complete search history.

(56) References Cited

U.S. PATENT DOCUMENTS

| | | | |
|---|---|---|---|
| 5,434,837 A | 7/1995 | Haneda et al. | |
| 6,243,171 B1 | 6/2001 | Haneda | |
| 6,982,809 B2 * | 1/2006 | Kagaya | 358/1.18 |
| 7,119,922 B2 * | 10/2006 | Kimura et al. | 358/1.8 |
| 2001/0050684 A1 | 12/2001 | Smith | |

FOREIGN PATENT DOCUMENTS

| | | |
|---|---|---|
| EP | 0-733 995 A | 9/1996 |
| JP | 8-95163 | 4/1996 |
| JP | 09-046577 | 2/1997 |
| JP | 11-249885 | 9/1999 |
| JP | 2000-034023 | 9/2000 |
| JP | 2000-57975 | 2/2002 |
| JP | 2002-057975 A | 2/2002 |

* cited by examiner

Primary Examiner—Edward L. Coles
Assistant Examiner—Thomas J Lett
(74) Attorney, Agent, or Firm—Fulbright & Jaworski L.L.

(57) ABSTRACT

A photographic printing system includes a film reader for reading photographic image of a photographic film, a printer for printing the photographic image on an image recording medium based on photographic image data obtained through the film reader, a writer for writing at least the photographic image data in a loaded optical disc of the WORM (Write Once Read Many) type, and a controller for controlling the writing process of the writer. The controller allows writing, in the optical disc, of both the image data and a display processing program for displaying the image data written in the optical disc on a monitor when the optical disc has no data pre-written therein and allows writing, in the optical disc, of the image data when the optical disc has such display processing program pre-written therein.

2 Claims, 4 Drawing Sheets

PHOTOGRAPHIC PRINTING SYSTEM

BACKGROUND OF THE INVENTION

1. Field of the Invention

The present invention relates to a photographic printing system including a film reader for reading photographic image of a photographic film, a printer for printing the photographic image on an image recording medium based on the photographic image data obtained through the film reader, a writer for writing at least the photographic image data in a loaded optical disc of the WORM (Write Once Read Many) type, and a controller for controlling the writing process of the writer.

2. Description of the Related Art

With such photographic printing system as described above, the photographic image recorded in a photographic film is read by the film reader and then based on the photographic image data thus obtained, a photographic image is formed on an image recording medium such as a print paper, whereby a photographic print is obtained. In this, in parallel with or independently of the making the photographic print, there is often provided a service for the customer for writing the photographic image data in an optical disc of the WORM type. Here, "WORM optical disc" refers to a type of optical disc which allows only one time writing into its predetermined writing area, not allowing erasing of the data once written therein and allows reading of the data therefrom for as many times as desired. Such WORM optical disc includes the so-called CD-R and DVD-R.

In the above-described service of writing photographic image data in an optical disc for the customer, it would be inconvenient if this were done for only the writing of the photographic image data. It will be convenient if the customer can display the written photographic image data on e.g. a monitor of the personal computer system of the customer. Then, in order to provide this advantageous possibility, it is usually done to write also, in the same optical disc, a display processing program to be used for monitor display of the written photographic image. Incidentally, since the WORM type optical disc allows writing of additional or different data in a different writing area thereof after first writing operation thereof, it is also possible to write, in advance, such display processing program in the optical disc. To cope with this situation, the photographic printing system is often configured to be capable of handling both the first type of optical disc which is available in the market with the display processing program written therein in advance and the second type of optical disc which is available with no such display processing program pre-written therein. Hence, the operator of such photographic printing system needs to check whether each optical disc to be handled has such data pre-written therein or not and then inputs the result to the photographic printing system.

The photographic printing system of the type operable to write photographic image data and a program at one time in an optical disc is known from e.g. Japanese Patent Application "Kokai" No. 2002-57975. In this, its data recording section is adapted for recording in a CD-R, not only photographic image data and audio data, but also a multimedia playing program for allowing synchronized output of the photographic image data and the audio data.

However, in the case of the above system capable of handling both types of optical discs, the first type pre-written with the display processing program and the second type without such program pre-written therein, if the operator errs in the input of the disc type to the system, this can lead to such inconvenience as the display processing program (which is to be provided as an additional service for the customer) being not written into the optical disc at all or a further (different) display processing program being written erroneously into the optical disc in which the display processing program has been written already, so that the commercial value of the optical disc will be significantly impaired.

SUMMARY OF THE INVENTION

A primary object of the present invention is to facilitate selective handling of the optical discs by the above-described type of photographic printing system capable of handling both the optical disc having a display processing program pre-written therein and the optical disc having no such program pre-written therein.

For accomplishing the above-noted object, according to the present invention, a photographic printing system comprises a film reader for reading photographic image of a photographic film, a printer for printing the photographic image on an image recording medium based on the photographic image data obtained through the film reader, a writer for writing at least the photographic image data in a loaded optical disc of the WORM (Write Once Read Many) type, and a controller for controlling the writing process of the writer;

wherein said controller allows writing, in the optical disc, of both the image data and a display processing program for displaying the image data written in the optical disc on a monitor when the optical disc has no data pre-written therein and allows writing, in the optical disc, of the image data when the optical disc has such display processing program pre-written therein.

With the above-described construction, the controller reads any data written in the WORM optical disc loaded to the writer and automatically determines whether or not to allow writing of only the photographic image data or both the photographic image data and the display processing program, depending on whether such program is written in advance in the optical disc. Hence, the operator of the photographic printing system can handle both types of optical discs without having to check whether each subject optical disc has such program data pre-written therein or not. As a result, it has become possible to facilitate selective handling of the optical discs by the type of photographic printing system capable of handling both the WORM type optical disc having a display processing program pre-written therein and the WORM type optical disc having no such program pre-written therein.

According to one preferred embodiment of the present invention, the controller inhibits writing of the image data when the optical disc includes data other than the display processing program pre-written therein. In this invention, as described above, it is assumed that the photographic printing system is to handle both types of optical discs, one having no data pre-written therein at all (blank disc) and the other having only the display processing program pre-written therein. However, for some reason, it may happen that the customer may erroneously hand an optical disc having other data stored therein to the system operator and the operator may load this disc to the writer, so that photographic image data or the like may be written erroneously in this optical disc. If such erroneous writing of photographic image data or the like to the optical disc has occurred, the other data originally present in the disc may become unusable. In view of this problem, according to the above-described construction proposed by the present invention, if the optical disc has some data pre-written therein and this data is not the display processing program, the controller inhibits writing of the image data to this optical disc, thereby to protect this optical disc against erroneous writing.

Further and other features and advantages of the invention will become apparent upon reading the following detailed description of the preferred embodiments thereof with reference to the accompanying drawings.

DESCRIPTION OF THE PREFERRED EMBODIMENTS

A photographic printing system relating to an embodiment of the invention will now be described in details with reference to the accompanying drawings.

Figure 1:
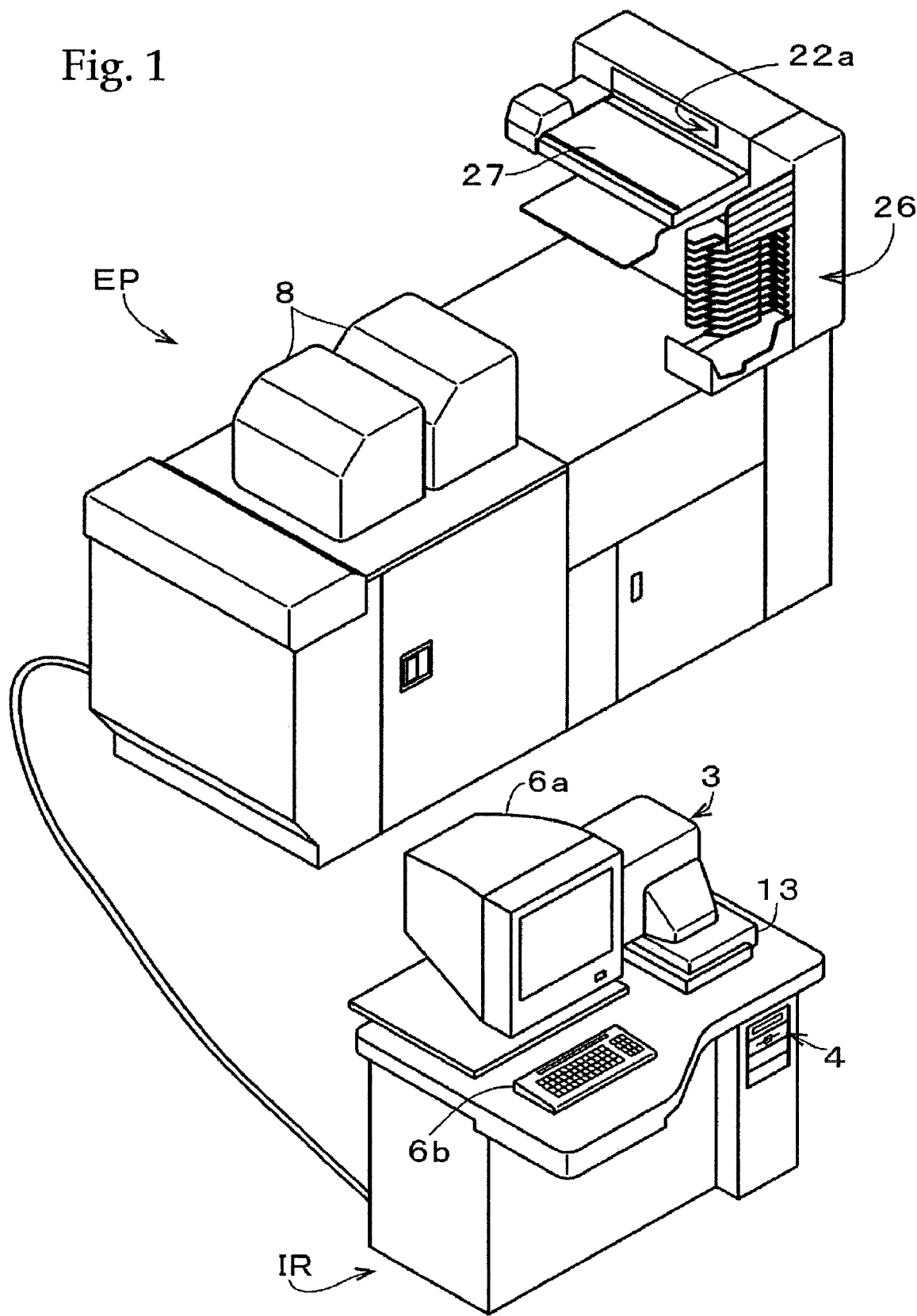
FIG. 1 is a perspective view showing an appearance of the photographic printing system relating to one preferred embodiment of the present invention.
Figure 2:
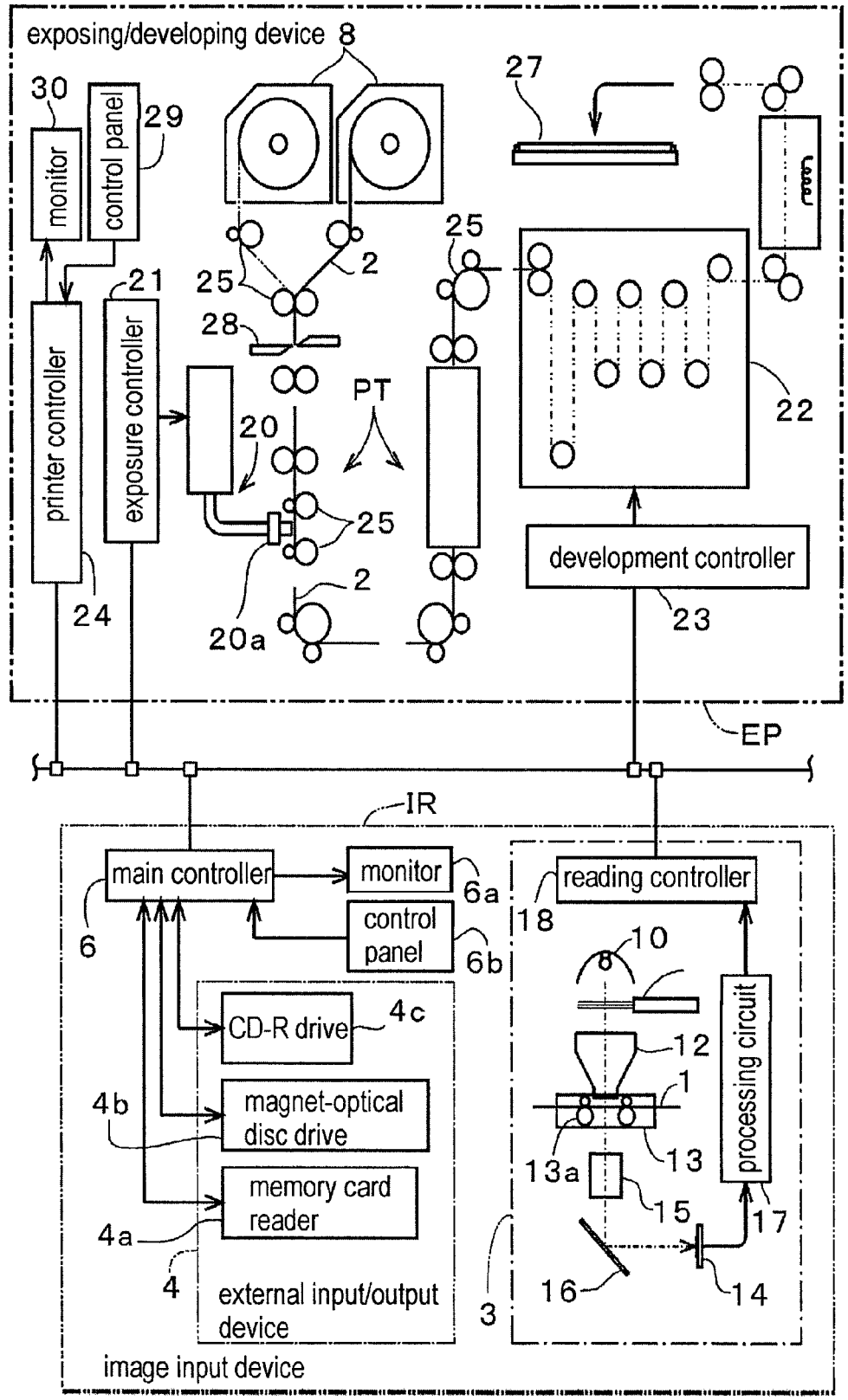
FIG. 2 is a block diagram of a photographic printing system relating to the embodiment.

The photographic printing system DP illustrated in this embodiment is commonly known as "digital minilab" and, as shown in FIGS. 1 and 2, includes an image input device IR for inputting image data for making photographic prints from a developed photographic film 1 (simply, "film 1" hereinafter), a memory card, a magnet-optical disc, a CD-R or the like, and an exposing/developing device (one example of a printer) EP for exposing the image data inputted through the image input device IR on a print paper 2 as an image recording medium.

General Construction of Image Input Device IR

As shown schematically in FIG. 2, the image input device IR includes a film scanner 3 acting as a film reader for reading photographic image of the film 1, an external input/output device 4 having such components as a memory card reader 4a, a magnet-optical disc drive 4b and a CD-R drive 4c as image writers, and a main controller 6 comprising a so-called personal computer for controlling the film scanner 3 and the external input/output device 4 and controlling also the entire photographic printing system DP. Further, the main controller 6 is connected to a monitor 6a for displaying a simulation image of a finished print image as well as various control information and a control panel 6b for allowing manual setting of the exposure conditions and input operations of various control information.

Construction of Film Scanner 3

The film scanner 3 includes a halogen lamp 10, a light-modulating filter 11 for adjusting color balance of beam of light emitted from the halogen lamp 10, a mirror tunnel 12 for uniformly mixing color components of the light past the light-modulating filter 11, a film mask unit 13 having a transport mechanism 13a as well as a film mask (not shown) or the like for retaining the film 1 fixed in a predetermined reading position, a CCD line sensor unit 14 for effecting photoelectric conversion of the photographic image of the film 1, a lens 15 for focusing the image of the film 1 on the CCD line sensor unit 14, a mirror 16 for bending an optical path by 90 degrees, a processing circuit 17 for effecting amplification and A/D conversion or the like of output signals from the CCD line sensor unit 14, and a reading controller 18 for controlling this entire film scanner 3.

The CCD line sensor unit 14 includes three rows of CCD line sensors each including about 5000 units of CCD elements arranged side by side along the width of the film 1. On the light-receiving face of each CCD line sensor, color filters of red, green and blue are formed so as to pick up the photographic image of the film 1 in color-separated state. The reading controller 18 is operable, in response to a reading instruction from the main controller 6, to initiate transportation of the film 1 set to the film mask 13 and also to output the image data of the photographic image of the film 1 from the processing circuit 17 to the main controller 6.

Writing Operation of Image Data by External Input/Output Device 4

With the photographic printing system DP relating to the present embodiment, in parallel with or independently of making photographic prints based on the image source such as the film 1 brought in by a customer, if requested by the customer, the system is adapted for providing an additional service of writing image data corresponding to the images to be printed on the print paper 2 into such medium as a CD-R or an magnet-optical disc or the like and providing this medium to the customer together with the photographic prints. To this end, the above-described respective components of the external input/output device 4 will be employed. The image data to be written into each medium comprises the data obtained by image processing of the image data inputted via e.g. the film scanner 3 for the subsequent printing operation by the exposing/developing device EP. This data is subject to a format conversion and/or has the number of pixels appropriately reduced, in accordance with e.g. the data writing capacity of each particular type of medium.

Now, by way of example, operations for writing the data in a CD-R and operations for writing the data in a magnet-optical disc will be described. First, the data writing operations to a CD-R medium as an example of the WORM type optical disc will be described with reference to the flowchart of FIG. 3 executed by the main controller 6.

With the photographic printing system DP relating to the instant embodiment, in principle, the system is used for writing image data to the type of CD-R medium which is available on the market with a display processing program for causing the written image data to be displayed on a monitor of e.g. a personal computer being written in advance in the disc (in the following discussion, this display processing program will be referred to simply as "a viewer" hereinafter) However, when requested by a customer, the system is capable also of writing photographic image data in a totally new CD-R medium.

Figure 3:
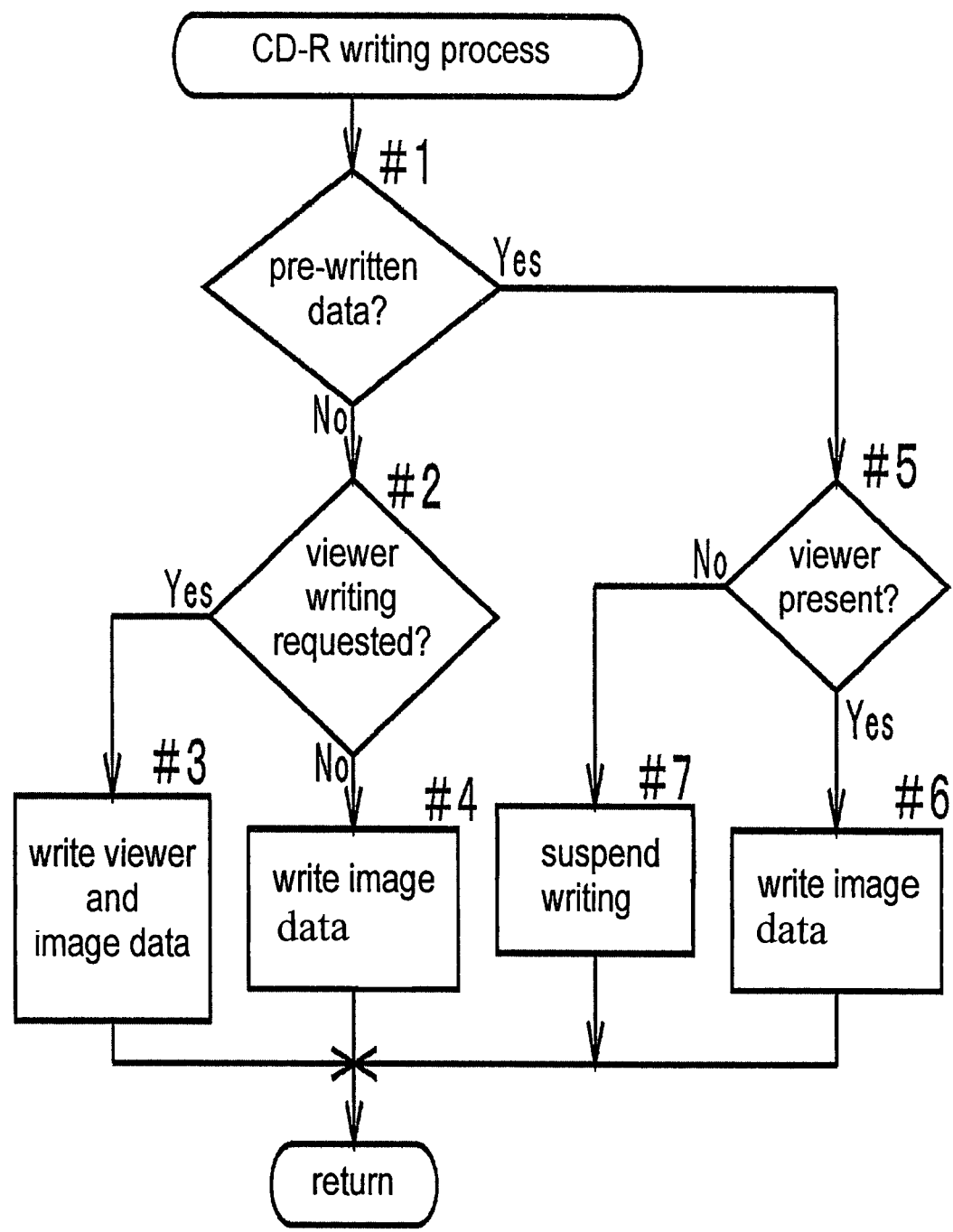
FIG. 3 is a flowchart of a data writing process in the embodiment of the invention.

When the system operator gives an instruction, from the control panel 6a, for writing the photographic image data to the CD-R media with the CD-R medium being set to the CD-R drive 4c, the controller 6 starts the process of FIG. 3. First, the controller checks whether the CD-R medium set on the CD-R drive 4c is under a condition allowing data writing or not and then checks whether any data is pre-written in this CD-R medium or not (step #1).

If it is determined that this CD-R medium is a never-used, totally new medium without any data written therein (step S1), then, the controller checks the setting condition of the system indicating presence/absence of a customer's request for writing of the viewer (step #2). If the viewer writing is being requested, the viewer and the photographic image data are written together into the CD-R and then a finalizing process ("close session") is effected (step #3). Conversely, if no viewer writing is requested, the photographic image data alone is written into the CD-R and then the finalizing process is effected (step #4). Incidentally, it is preferred that unlike the type of the viewer pre-written in the CD-R medium, the viewer written at step #3 be a simple viewer.

On the other hand, if it is found (step #1) that certain data is written in the writing area of the CD-R medium loaded to the CD-R drive 4c, the process proceeds to determine whether this data constitutes the viewer or not by checking an ID code of the viewer indicating the data being that of the viewer is written in the predetermined area of the CD-R medium or not (step #5).

If it is found that the data written in the CD-R does constitute the viewer data, then, it may be determined that this medium is a un-used CD-R with the viewer alone being pre-written therein. Therefore, the photographic image data is written and the finalizing process is effected, thereby to complete it as a readable CD-R (step #6).

On the other hand, if it is determined at step #5 that the data written in the CD-R medium is not viewer constituting data, the writing operation of the photographic image data will be suspended and this fact is displayed on the monitor 6a (step #7).

That is to say, the controller 6 includes a function for allowing writing of the photographic image data to the loaded optical disc when the data written in the optical disc (CD-R medium) loaded to the CD-R drive 4c as the writer comprises a display processing program (i.e. the viewer) for causing the photographic image date written in the optical disc to be displayed on a monitor; and also for allowing writing of both the photographic image data and the display processing program to the loaded optical disc when no such data is written in the disc.

Further, the controller 6 having such writing control function described above inhibits writing of the photographic image data to the loaded optical disc when certain data is pre-written in the optical disc (CD-R medium) and when this data does not comprise the display processing data (viewer).

Next, the data writing operations to the magnet-optical disc will be described with reference to the flowchart of FIG. 4 effected by the controller 6.

Figure 4:
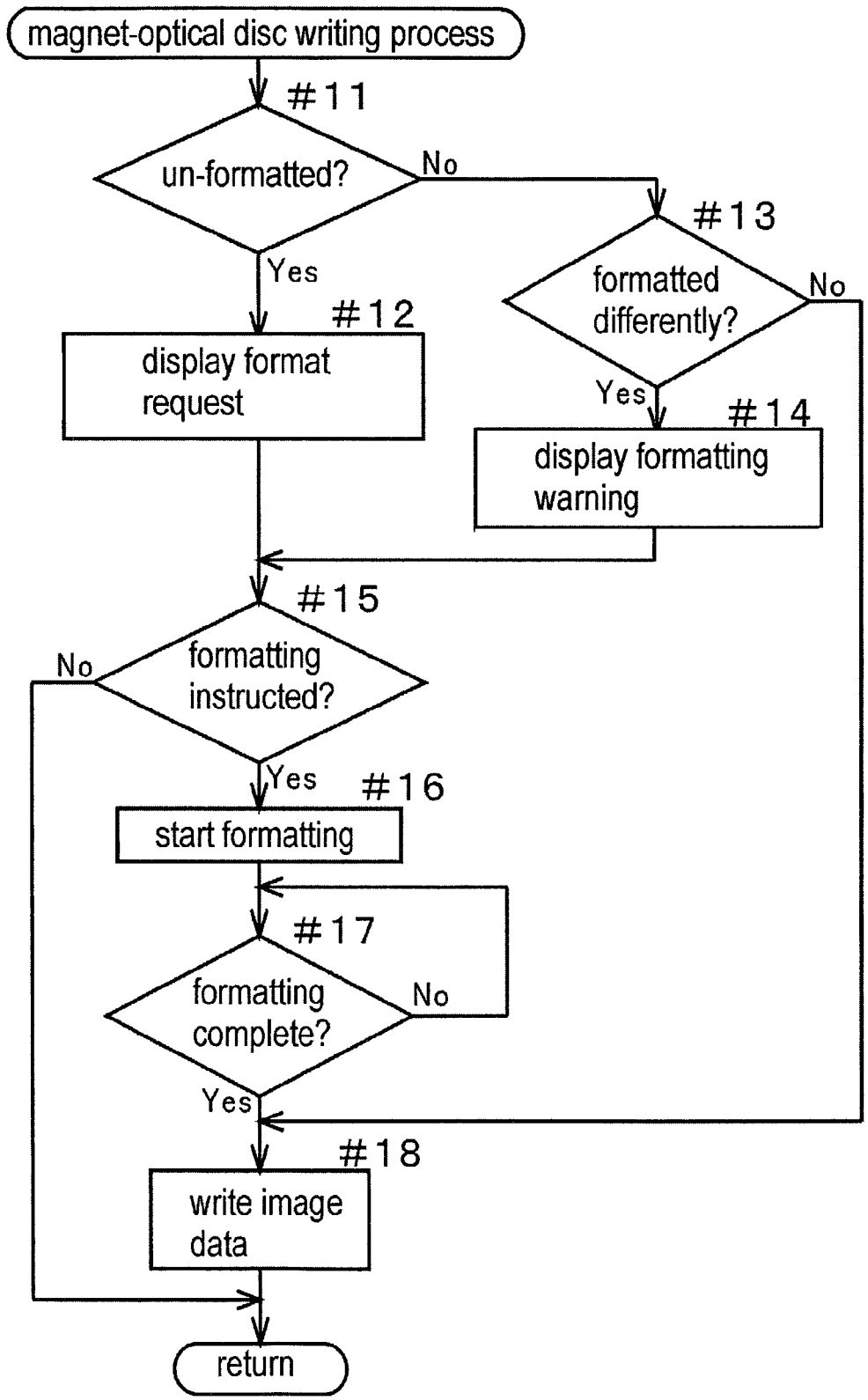
FIG. 4 is a flowchart of the data writing process in the embodiment of the invention.

When the system operator gives an instruction, from the control panel 6a, for writing the photographic image data to the magnet-optical disc with the magnet-optical disc being set to the magnet-optical disc drive 4b, the controller 6 starts the process of FIG. 4. First, the controller checks whether the magnet-optical disc set on the magnet-optical disc drive 4b is formatted or not (step #1). If it is found that this is an un-formatted optical disc, the controller causes the monitor 6a to display a message: "data writing not possible with the medium. Is it to be formatted?" to confirm the user's intension for formatting.

On the other hand, if it is determined that the loaded magnet-optical disc is a formatted one, but is of a type not usable with the photographic printing system (step #13), the controller causes the monitor 6a to display a message: "data is already written in medium. Is it to be formatted?", to warn the user of the presence of data which will be erased if the disc is formatted (step #14).

After the above-described displaying operation for confirmation of the user's intension for formatting, when the operator inputs from e.g. the control panel 6b an instruction for formatting (step #15), the process initiates the formatting operation (step #16). When the formatting is completed (step #17), the photographic image data is written into the disc (step #18).

Incidentally, this process illustrated in FIG. 4 may be applied also to a writing operation of the image data to other types of recording media such as a flexible disc.

General Construction of Exposing/Developing Device EP

The exposing/developing device EP includes an exposing unit 20 having a PLZT print head 20a, an exposure controller 21 for controlling the exposing unit 20, a developing unit 22 for developing the print paper 2 exposed by the exposing unit 20, a development controller 23 for controlling a print paper transporting mechanism provided within the developing unit 22 and controlling also developing solutions, a printer controller 24 for controlling this entire exposing/developing device EP, and the print-paper transport mechanism PT for transporting the print paper 2 drawn out of a print paper magazine 8 to the developing unit 22 by means of e.g. a number of transport rollers 25. These components are all accommodated within a housing of the device. In this particular embodiment, the exposing unit 20 and the exposure controller 21 together constitute the printer operable to form photographic images on the print paper 2 as the image recording medium based on the photographic image data obtained through the film scanner 3 and then output the paper as photographic print.

Outside the housing of the exposing/developing device EP, there are provided a sorter 26 for sorting out the print papers 2 developed and dried at the developing unit 22 according to the customer's order; and a conveyer 27 for conveying the print papers 2 discharged from an outlet 22a to the sorter 26. Further, a control panel 29 for allowing inputs of various kinds of control information and a monitor 30 for displaying the control information are also provided.

Further, in midway of the transport path of the print paper transporting mechanism PT, there is provided a cutter 28 for cutting the elongate print paper 2 drawn out of the print paper magazine 8 into pieces of a predetermined print size.

Photographic Prints Making Operation

Next, a photographic prints making operation by the photographic printing system having the above-described construction will be described briefly.

When the operator inputs an instruction for outputting the photographic image information of the film 1 in the form of photographic prints, the controller 6 instructs the film scanner 3 to read the film 1, so that the controller receives one after another, from the reading controller 18, the photographic image data of the photographic image of the film 1 and stores them in a memory incorporated therein.

On the other hand, if the operator inputs an instruction for outputting photographic prints from the photographic image data recorded in a recording medium such as a memory card, a magnet-optical disc or a CD-R, the controller 6 instructs an associated drive of the external input/output device 4 to read the photographic image data, so that the controller receives the image data from that drive and stores them in the memory.

Then, based on the photographic image data inputted as above, the controller 6 obtains by calculation a simulation image of the image data which would result if a print were produced from the data and displays this simulation image on the monitor 6a.

By observing this simulation image on the monitor 6a, the operator will carry out, via the control panel 6b, a correction such as color adjustment thereon if the displayed image is found not appropriate.

The image processing circuit of the controller 6 effects, if needed, the correction on the inputted photographic image data and converts this into print data suitable for the exposing/developing device EP.

This print data is then transmitted to the printer controller 24 of the exposing/developing device EP and stored in the memory incorporated within the print controller 24.

Upon detection of arrival of the leading end of the print paper 2 at the predetermined exposure start position based on the transportation information of the print paper 2 obtained from the print paper transporting mechanism PT, the print controller 24 gives an instruction to the exposure controller 21 for initiating an exposure operation and transmits the print data to the exposure controller 21 at a speed corresponding to the exposing speed of the exposure unit 20.

Then, the exposure controller 21 activates the respective optical shutters of the PLZT print head 20*a* according to the received print data, thereby to form a latent image of the photographic image on the print paper 2.

The print paper 2 exposed by the exposure unit 20 is transmitted by the print paper transporting mechanism PT to the developing unit 22, in which the paper is caused to pass respective developing tanks to be developed thereby. And, the developed print paper 2 is dried and then discharged from the outlet 22*a* as photographic prints on the conveyer 27 and sorted by the sorter 26 according to the customer's orders.

Further, if there is a request from the customer for writing the digital data of the photographic image in a CD-R, a magnet-optical disc or the like, the photographic image data and so on will be written in the CD-R, the magnet-optical disc or the like by the process described above.

Other Embodiments

Next, other embodiments of the invention will be described.

(1) In the foregoing embodiment, the writing operation of the image data into the CD-R medium as an example of the WORM type optical disc is effected in parallel with making of the photographic prints. Alternatively, the writing operation of the image of the photographic image into the CD-R medium may be carried out, without making its photographic prints.

(2) In the foregoing embodiment, the printer includes the exposure unit 20 of the PLZT optical shutter type. In this invention, the specific construction of the printer may vary in many ways, such that the printer may employ a laser exposure type image exposure unit or the print may be a an inkjet printer. Further, in the foregoing embodiment, the image recording medium PS used for making photographic prints comprises the print paper 2. Other kinds of image recording media PS such as a photosensitive film and so on may be employed also.

(3) In the foregoing embodiment, the CD-R is employed as an example of the WORM type optical disc. However, the invention may be applied also to other kinds of WORM type optical discs such as the DVD-R etc.

In these manners, the invention may be embodied in any other manner as described above. Further changes or modifications will be apparent for those skilled in the art from the foregoing disclosure within the scope of the invention defined in the appended claims.

The invention claimed is:

1. A photographic printing system comprising:
   a film reader for reading photographic image of a photographic film;
   a printer for printing the photographic image on an image recording medium based on photographic image data obtained through the film reader;
   a writer for writing at least the photographic image data in a loaded optical disc of the WORM (Write Once Read Many) type; and
   a controller for controlling the writing process of the writer;
   wherein said controller allows writing, in the optical disc, of both the image data and a display processing program for displaying the image data written in the optical disc on a monitor when the optical disc has no data pre-written therein and allows writing, in the optical disc, of the image data when the optical disc has such display processing program pre-written therein; and wherein the controller inhibits writing of the image data when the optical includes data other than the display processing program pre-written therein in an appendable mode.

2. The photographic printing system according to claim 1, wherein the controller checks whether the display processing program is written in advance in the optical disc or not, based on an ID code for the display processing program written at a predetermined area of the optical disc.

* * * * *